Jan. 14, 1936.   S. M. DAVISON   2,027,372
APPARATUS FOR FREEZING MATERIALS
Filed July 12, 1934   3 Sheets-Sheet 1
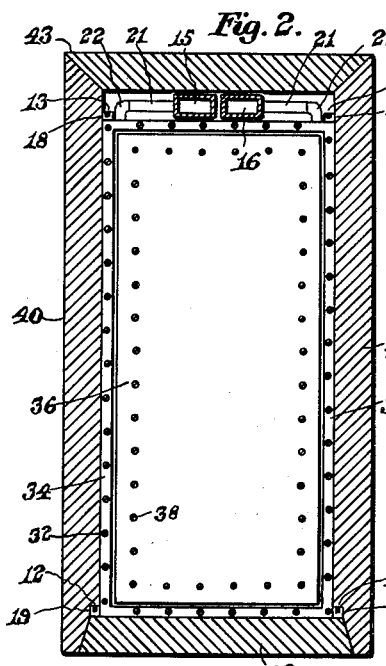
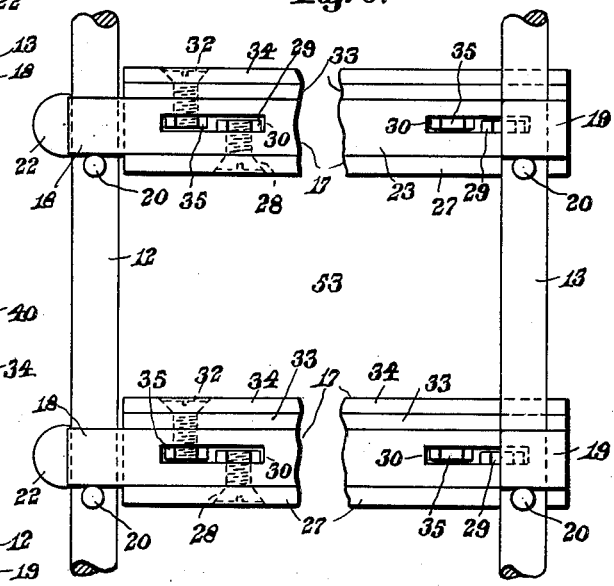
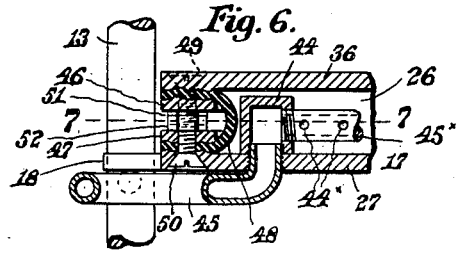
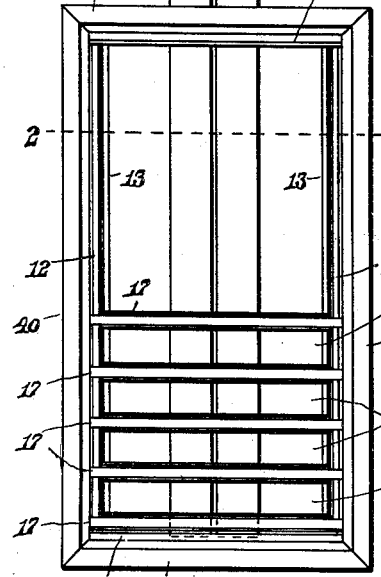
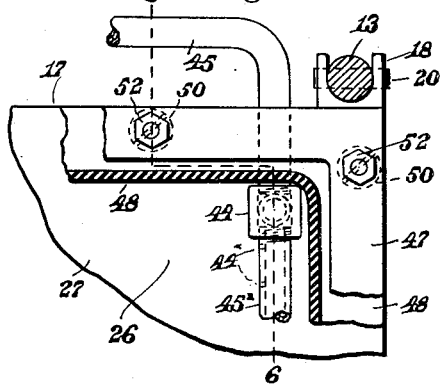
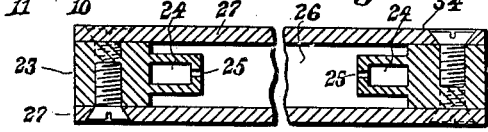
Inventor:
Sidney M. Davison,
by Walter E. Lombard,
Atty.

Jan. 14, 1936.　　　S. M. DAVISON　　　2,027,372
APPARATUS FOR FREEZING MATERIALS
Filed July 12, 1934　　　3 Sheets-Sheet 2
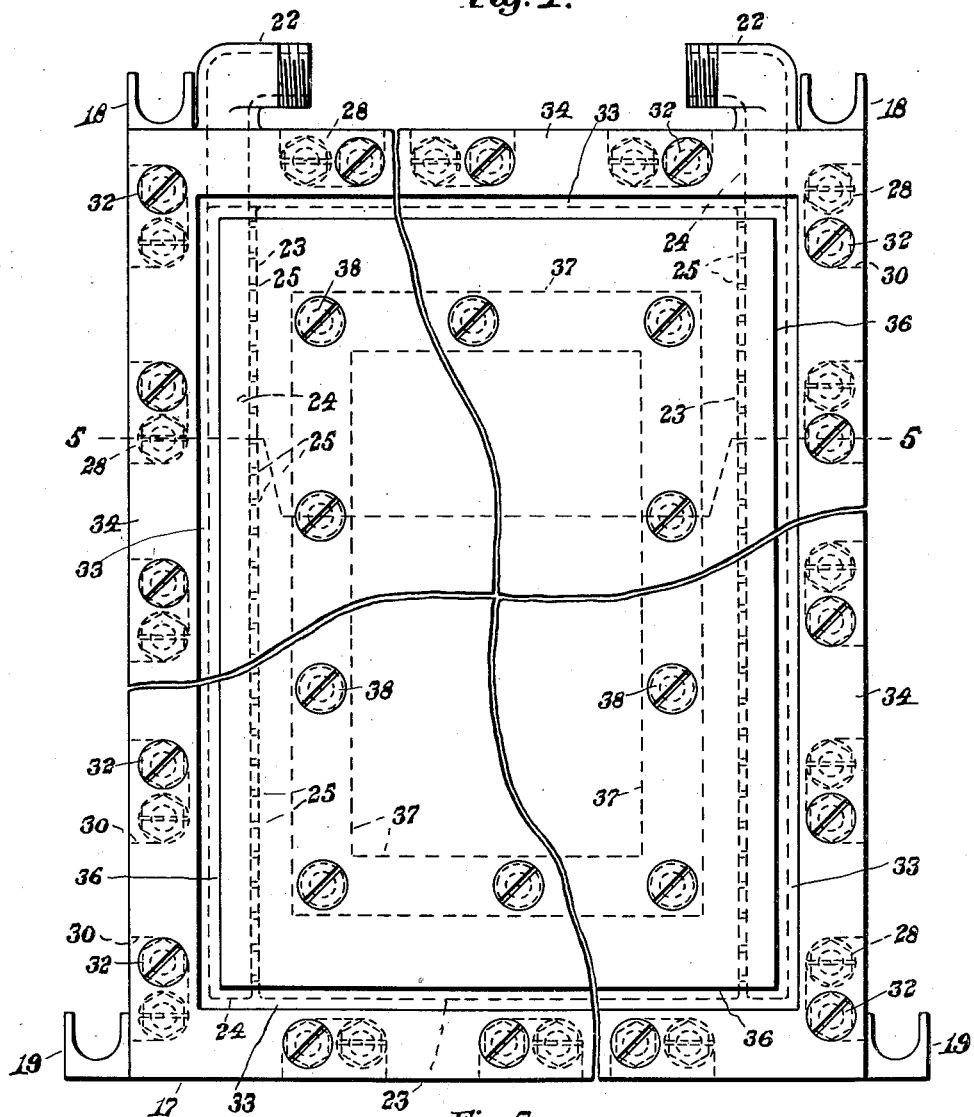
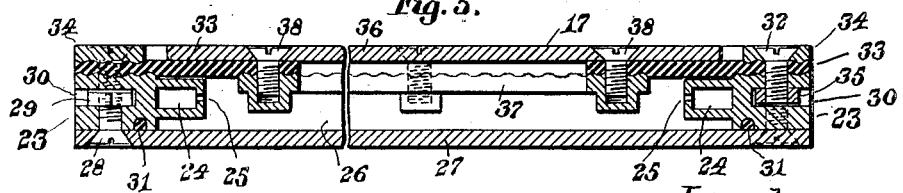
Inventor:
Sidney M. Davison.
by Walter E. Lombard,
Atty.

Jan. 14, 1936.                S. M. DAVISON                2,027,372
                       APPARATUS FOR FREEZING MATERIALS
                           Filed July 12, 1934         3 Sheets-Sheet 3
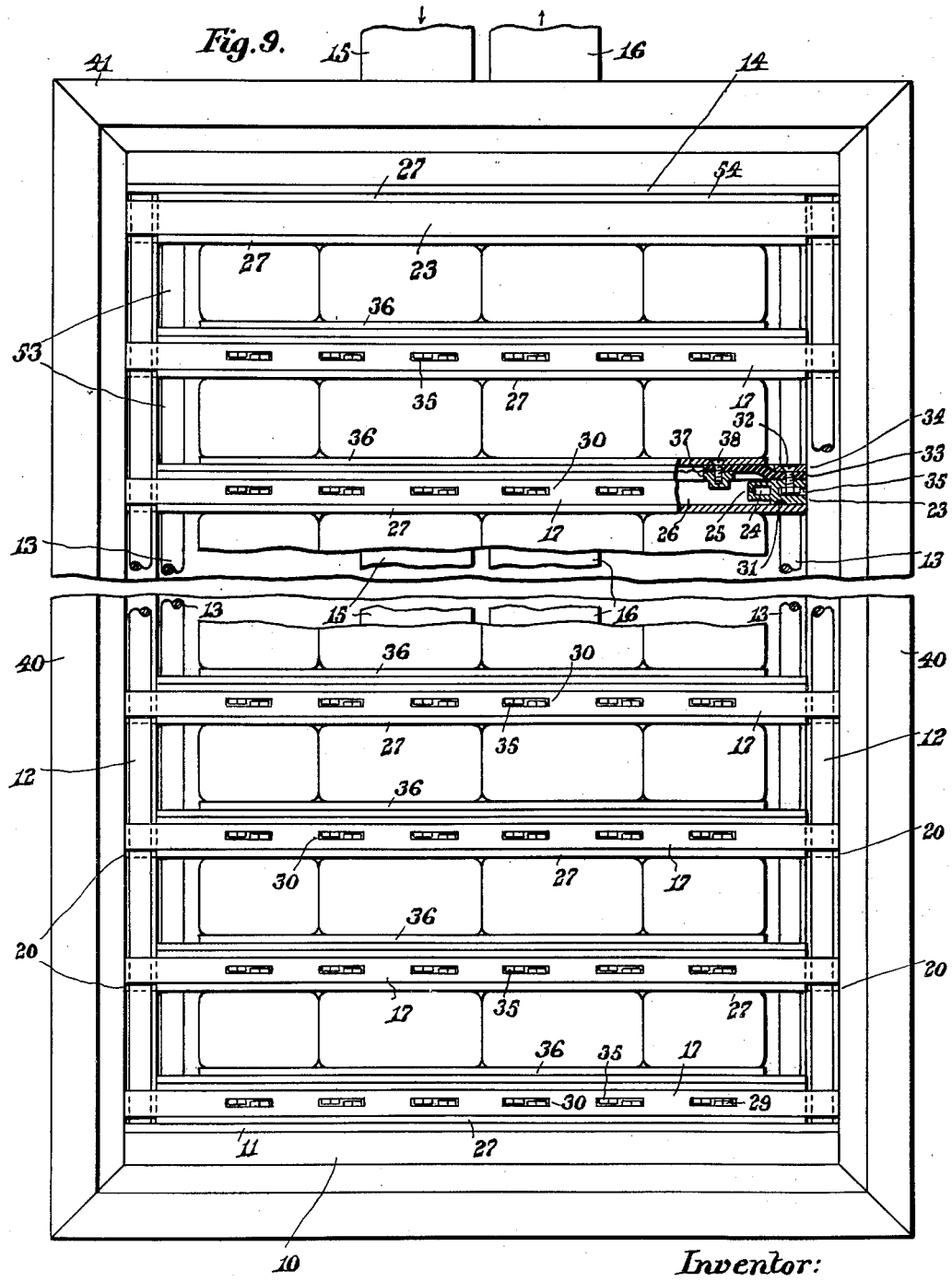
Inventor:
Sidney M. Davison,
by Walter E. Lombard.
Atty.

Patented Jan. 14, 1936

2,027,372

UNITED STATES PATENT OFFICE 2,027,372

APPARATUS FOR FREEZING MATERIALS

Sidney M. Davison, Annisquam, Mass.

Application July 12, 1934, Serial No. 734,737

24 Claims. (Cl. 62—114)

This invention relates to freezing apparatus and particularly to apparatus for freezing perishable material such as fish, meat, vegetables, berries, and other food products, and is also adapted for use in freezing liquids of a perishable nature.

The object of the invention is to provide a simple and inexpensive apparatus which will accomplish as good if not better results than are obtained by more expensive and complicated apparatus.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents a front elevation of a freezing apparatus embodying the principles of the present invention, the front insulating members being removed.

Figure 2 represents a horizontal section on line 2, 2 on Fig. 1 with the removable front insulating members in position.

Figure 3 represents a detail showing in side elevation means for supporting the various freezing units, said figure being drawn to an enlarged scale.

Figure 4 represents a plan of one of the freezing units drawn to an enlarged scale.

Figure 5 represents a transverse section of same on line 5, 5 on Fig. 4.

Figure 6 represents a vertical sectional detail of a modification of one end of a freezing unit, on line 6, 6, on Fig. 7.

Figure 7 represents a horizontal section of the same on line 7, 7, on Fig. 6.

Figure 8 represents a vertical section of the upper freezing unit, and

Figure 9 represents a front elevation, partly in section, of the freezing apparatus drawn to an enlarged scale and showing each of the lower freezing units expanded upwardly to create a pressure upon the food products positioned thereon.

Similar characters indicate like parts throughout the several figures of the drawings.

In the drawings, 10 is a plate of insulating material having surmounted thereon a metal base plate 11 from a front end of which extends upwardly a pair of rods 12, a similar pair of rods 13 extending upwardly from the rear of said plate.

The upper ends of said rods 12, 13 are connected to a top plate 14.

The plates 11, 14 and rods 12, 13 form a support on which a plurality of refrigerating units may be positioned, spaced apart and one above another.

Extending upwardly from the bottom plate 11 and preferably closed at their bottom ends are two tubular members 15, 16.

The upper ends of these tubular members 15, 16 are connected to a source of supply of a freezing liquid or refrigerant, said refrigerant passing through the tubular member 15 and returning to said source of supply through the tubular member 16.

Positioned by the rods 12, 13 are a plurality of freezing units 17, each unit having at its rear end a pair of forked members 18 which straddle the rods 13 and another pair of forked members 19 which straddle the front rods 12.

These forked members 18, 19 may rest, if desired, upon pins 20 or similar projections located at different heights on said rods 12, 13.

The tubular members 15, 16 have extending laterally therefrom flexible pipes 21, each pipe 21 being connected to a nipple 22 formed upon the rear end of a rectangular plate 20 forming a part of each freezing unit 17.

From each pair of nipples 22 parallel conduits 24 extend the entire length of each unit 17, said conduits having therein openings 25 through which the freezing liquid or refrigerant passes from one conduit 24 into the chamber 26 of said unit 17 and from said chamber 26 through similar openings 25 in the oppositely disposed conduit 24.

The rectangular plate 23 is secured to a stationary metal refrigerating plate 27 by means of screws 28 threaded to nuts 29 in slots 30 in the outer sides of said rectangular plate 23.

Between the plate 23 and the stationary plate 27 are gaskets 31 adapted to make a water tight joint between said members 23 and 27.

Secured to the upper side of said member 23 by means of screws 32 is a rectangular flexible rubber plate 33.

The screws 32 extend through a rectangular metal clamp plate 34 and are threaded to nuts 35 in the slots 30.

This rectangular flexible rubber plate 33 extends some distance into the chamber 26 of each unit 17 and is surmounted by a metal refrigerating plate 36 with the inner edges of said plate 33 clamped to said refrigerating plate 36 by means of the rectangular clamping member 37 and screws 38 threaded to said clamping member 37.

By making each unit 17 in this manner one refrigerating plate 36 is movable toward and from the other parallel refrigerating plate 27 which is normally stationary.

As the freezing liquid or refrigerant is admitted to the chamber 26 it will force the movable plate 36 upwardly into contact with the food product being frozen and subject said material to pressure while the freezing operation continues.

While in Figs. 4 and 5 of the drawings the movable plate 36 is shown horizontal, it is obvious that, when freezing liquids, the unit 17 may be disposed on the rods 12, 13 with the stationary plate 27 at an angle of 90°.

Preferably all of these units 17 disposed on the vertical rods 12, 13 are enclosed by side insulating plates 40, and a top plate 41 of insulating material.

At the front of the apparatus is a removable plate 42 and at the rear of the apparatus is a removable plate 43, both of these plates being of insulating material similar to that used in plates 40, 41.

In Figs. 6 and 7 a modification of the freezing unit 17 is shown in which a box 44 in the chamber 26 has a pipe 45 leading to the tubular member 15 to admit a supply of freezing liquid or refrigerant to said box 44 and to a pipe 45x leading therefrom and extending lengthwise of the unit.

This pipe 45x extending from the box 44 is provided with a plurality of perforations 44x through which the freezing liquid may pass into one side of the chamber 26 across the same and through similar perforations 44x in another similar pipe 45x connected with the return tubular member 16.

In this modification the fixed refrigerating plate 27 is provided with forked projections 18, 19 straddling the rods 13 and 12.

Between the bottom refrigerating plate 27 and the upper refrigerating plate 36 are disposed two rectangular plates 46, 47 and between the upper rectangular plate 46 and the upper movable plate 36 is clamped one end of a flexible U-shaped member 48, preferably of rubber, while the opposite end of this U-shaped member 48 is clamped between the rectangular plate 47 and the lower refrigerating plate 27.

These plates 46, 47 are clamped to the member 48 by means of the screws 49 and 50, threaded respectively to the nuts 51 and 52.

The brine or other refrigerant passing through the chamber 26 exerts sufficient pressure to flex the U-shaped rubber members 48 and press the plates 36 upwardly against the food products being frozen, thereby allowing the heat to be extracted from said products by the refrigerating plates 27 and 36 contacting therewith.

The upper wall of conduit 24 forms a stop member to limit the downward movement of the flexible plate 33 shown in Figs. 4 and 5, and the upper walls of the boxes 44 limit the downward movement of the movable refrigerating plate 36 in the construction shown in Figs. 6 and 7.

The refrigerant admitted to the chamber 26 is pumped from the source of supply through the tubular member 15 and conduit 24 and as it enters the chamber 26 creates a pressure in said chamber which will force the movable refrigerating plate 36 upwardly into the space 53 above the units 17 and in which are disposed the food products to be frozen.

Consequently these food products will be always under pressure during the freezing operation and the amount of pressure may be regulated by any well known means.

The refrigerant may be brine or any other liquid which will refrigerate the plates 27 and 36.

The supporting framework 11, 14, 12, 13 is easily assembled in any position where it is desired to freeze food products.

Such an open supporting framework is inexpensive to construct.

Each unit 17 is of similar construction except the upper unit 54 which does not require any movable plate 36, consequently this top unit 54 is constructed as shown in section in Fig. 8 of the drawings.

The unit 54 has a chamber 26 therein between two fixed plates 27, to which chamber the refrigerant may circulate as in the other units 17.

In case anything should happen with one of the units 17 it may be easily withdrawn from the supporting framework 11, 14, 12, 13 while repairs are being made thereto or a new unit substituted therefor.

All that is required to make this withdrawal possible is to disconnect the pipes 21 from the nipples 22, the flow of the refrigerant from the source of supply to the tubular members 15, 16 first being shut off by any suitable valves.

As there is no invention in the construction of these valves it is deemed unnecessary to illustrate the same.

When the casing is used made up of the insulating plates 40, 41, 42, 43, and it is necessary to remove one of the units, the rear-plate 43 and front plate 42 are removed, the removal of the rear plate giving the operator access to the pipes 21 so that they can be disconnected from the nipples 22, after which either one or more units may be removed from the supporting framework.

The spaces 53 between the various units 17 may be varied according to the size of the different food products being frozen.

This makes a very economical freezing apparatus which can be used for freezing various food products.

The refrigerant supply and discharge pipes as shown in the drawings are arranged for the use of brine.

If a refrigerant is used in which gas is generated when the heat of the product is absorbed, it is obvious that the pipe lines must be arranged so that the gas cannot pocket at any place in the apparatus.

Brine is the preferred refrigerant, however, because of the simplicity of pressure control in the compartment between the fixed and movable plates, and also when brine is used only a low pressure would ever be used inside the chamber.

Brine has not the dangerous characteristics of many refrigerants, such as ammonia and carbon dioxide, for instance.

Valves may be used in flexible pipes 21 and a drain plug installed in the fixed plates 27 to permit the drainage of any individual chambers 26, should the withdrawal of any unit be necessary.

Where extensibility is not a necessary feature of the flexible connecting member, canvas may be used to reinforce the rubber, or the part may be made of canvas waterproofed by rubber, or otherwise.

Such a canvas member could be used at 48, in Figs. 6 and 7, for instance, by providing enough slack between the inside edges of 46 and 47.

The fixed plates of Figs. 6 and 7, or the forked members 18 and 19, may be bolted to the uprights 12 and 13 but it is preferred not to so secure the units, and when fixed or stationary plates are referred to it is meant that these plates are normally fixed or stationary in comparison with the movable plates 36.

It is obvious that both plates of each unit may be made movable without affecting the nature of the invention, but such a construction would be more complicated and expensive and the single movable plate is preferred.

It is believed that the operation and many advantages of the invention will be understood without further description.

Having thus described my invention, I claim:

1. A freezing apparatus comprising a support and spaced apart on said support a plurality of pairs of separated refrigerated plates of which one is movable relatively to the other, said plates of each pair having a flexible water tight connection between the edges thereof.

2. A freezing apparatus comprising a support and spaced apart on said support a plurality of freezing units, each unit having one side movable relatively to a parallel fixed side and connected thereto by a flexible member making a water tight joint.

3. A freezing apparatus comprising a support and spaced apart on said support a plurality of freezing units, each unit consisting in part of two refrigerated plates of which one is movable relatively to the other and said plates being connected at their edges by a flexible member making a water tight joint.

4. A freezing apparatus comprising a support and spaced apart on said support a plurality of freezing units, each unit consisting in part of two refrigerated plates of which one is movable relatively to the other and said plates being connected at their edges by a flexible member forming a water tight joint, and a casing of insulating material enclosing said support and units.

5. A freezing apparatus comprising a support, a plurality of freezing units spaced apart on said support, each unit consisting in part of two refrigerated plates of which one is fixed and the other movable relatively thereto and said plates being connected at their edges by a water tight joint, and stop members limiting the movement of the movable plate toward the fixed plate.

6. A freezing apparatus comprising a support and spaced apart on said support a plurality of freezing units, each unit consisting in part of two refrigerated plates of which one is movable relatively to the other, said plates being connected at their edges by an extensible member forming a water tight joint, and means for circulating a freezing liquid through said units.

7. A freezing apparatus comprising a support and spaced apart on said support a plurality of brine-containing units, each unit consisting in part of two refrigerated plates of which one is movable relatively to the other, said plates being separated and connected at their edges by a rubber member forming a water tight joint.

8. A freezing apparatus comprising a support, a plurality of separated freezing units positioned on said support and each unit consisting in part of two refrigerated plates of which one is movable relatively to the other, said plates being connected at their edges by a water tight joint, and means for circulating a refrigerant between the plates of each of said units.

9. A freezing apparatus comprising a support, a plurality of separated freezing units positioned on said support, each unit consisting in part of two refrigerated plates of which one is movable relatively to the other fixed plate, said plates being connected at their edges by a water tight joint, and means for circulating a refrigerant through said units, and forcing the movable plate away from the fixed plate.

10. A freezing apparatus comprising a support, a plurality of separated freezing units removably positioned on said supports and each unit consisting in part of two refrigerated plates movable relatively to each other and connected at their edges by a water tight joint, and means whereby the product to be frozen may be disposed between two adjacent units and in contact with two refrigerated plates.

11. A freezing apparatus comprising a support, a plurality of separated brine-containing units positioned on said support and each unit consisting in part of two refrigerated plates movable relatively to each other and connected at their edges by a water tight joint, and means whereby the product to be frozen may be disposed between said units and under pressure in contact with two refrigerated plates.

12. A freezing apparatus comprising a support, a plurality of separated freezing units positioned on said support, each consisting in part of two refrigerated plates movable relatively to each other and connected at their edges by a water tight joint, means whereby the product to be frozen may be disposed under pressure between two units in contact with two refrigerated plates, and means for circulating a refrigerant between the plates of each unit.

13. A freezing apparatus comprising a support, a freezing unit positioned on said support and having one side movably connected to a fixed parallel side by a water tight joint, and means for admitting a freezing liquid between the plates of said unit.

14. A freezing apparatus comprising a support, a freezing unit positioned on said support and having one side movably connected to a fixed parallel side by a water tight joint, means for admitting a freezing liquid between the plates of each unit, and insulating members enclosing said support.

15. A freezing apparatus comprising a support, a freezing unit positioned on said support and having one side movably connected to a fixed parallel side by a water tight joint, means for admitting a freezing liquid between the plates of each unit, and removable insulating members enclosing said support.

16. A freezing apparatus including four supporting posts and removably positioned on said posts a plurality of separated freezing units, each unit having one side plate movable relatively to a parallel plate, said plates having a flexible water tight connection between the edges thereof and forming a chamber for the circulation of a refrigerant.

17. A freezing apparatus comprising an insulated chamber, and a removable freezing unit insertable into said chamber and having one side movable relatively to a fixed parallel side and connected thereto by a water tight joint.

18. A freezing apparatus comprising a support and spaced apart on said support a plurality of chambered freezing units for the circulation of a refrigerant, said units being extensible to create a pressure on the food products during the freezing operation.

19. A freezing apparatus comprising a support and spaced apart on said support a plurality of chambered freezing units, each unit consisting in part of two refrigerated plates of which one is movable relatively to a parallel fixed plate and connected thereto at their edges by a flexible member forming a water tight joint, a pair of oppositely disposed perforated conduits in the chamber of each unit, and means for creating a circulation of a refrigerant through said chamber and conduits.

20. A freezing apparatus comprising a support, a plurality of brine-containing units spaced apart on said support, and means whereby each lower unit may be expanded separately to create a pressure upon the food products positioned thereon.

21. A refrigerating apparatus containing a plurality of units having a fixed metal plate and a movable metal plate, a spacing member between said plates and a flexible connecting member secured to an edge of said spacing member and one of the plates, making a watertight joint.

22. A refrigerating apparatus containing a plurality of units having a fixed metal plate and a movable metal plate, with a flexible connecting member secured between and to the edges of said plates, making a watertight joint.

23. A refrigerating apparatus containing a plurality of units each having two refrigerated metal plates, a spacer between said plates, a flexible connecting member secured around an edge of the spacer and to one of the plates, making a watertight joint, and means for admitting a refrigerant between said plates and exerting pressure on perishable food products while they are being refrigerated in said apparatus.

24. A refrigerating apparatus containing a plurality of units each having two refrigerated metal plates with a flexible connecting member secured to the edges of both plates, making a watertight joint, and means for admitting a refrigerant between said plates and exerting pressure on perishable food products while they are being refrigerated in said apparatus.

SIDNEY M. DAVISON.